No. 726,196. PATENTED APR. 21, 1903.
O. W. SIEBENHAAR.
HORSESHOE.
APPLICATION FILED JAN. 11, 1902. RENEWED OCT. 3, 1902.
NO MODEL.
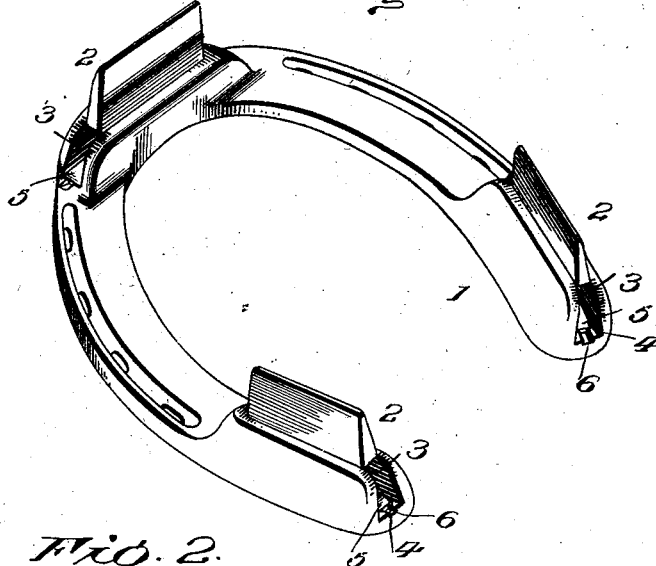
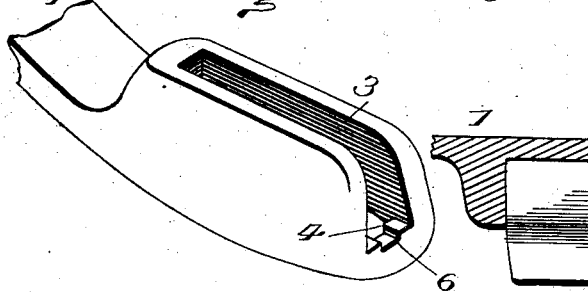
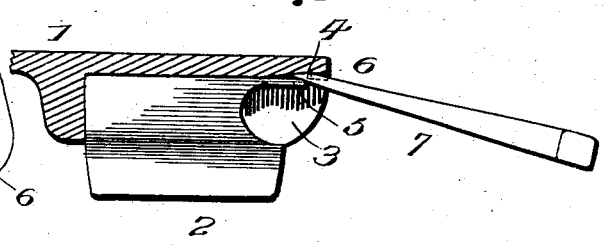
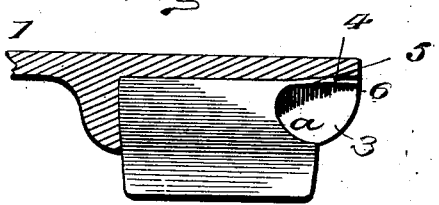
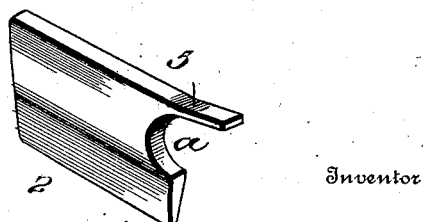

UNITED STATES PATENT OFFICE.

OTTO W. SIEBENHAAR, OF PRINCETON, WISCONSIN, ASSIGNOR OF ONE-HALF TO EDWARD FALBE, OF PRINCETON, WISCONSIN.

HORSESHOE.

SPECIFICATION forming part of Letters Patent No. 726,196, dated April 21, 1903.

Application filed January 11, 1902. Renewed October 3, 1902. Serial No. 125,845. (No model.)

*To all whom it may concern:*

Be it known that I, OTTO W. SIEBENHAAR, a citizen of the United States, residing at Princeton, in the county of Green Lake and State of Wisconsin, have invented certain new and useful Improvements in Horseshoes; and I do hereby declare the following to be a full, clear, and exact description of the invention, such as will enable others skilled in the art to which it appertains to make and use the same.

This invention has relation to the type of horseshoes provided with detachable calks, which are readily replaceable when worn or adapted to have one set of calks substituted for another, according to the condition of the surface over which the animal is to travel. For wear it is desirable to have broad flat calks; but to prevent slipping it is desirable that the calks be sharp and slender, so as to readily penetrate the slippery surface and enable the animal to obtain a sure footing.

In accordance with this invention the horseshoe is provided with seats for reception of the calks, the latter making interlocking connection therewith. To retain the calks in place, a locking extension forms an integral part of each calk and is adapted to enter a depression after the calk has been forced home, so as to prevent displacement thereof. When it is desired to remove the calks for any purpose, an instrument is utilized for prying the locking extension out of the depression, thereby admitting of the ready removal of the calk.

The invention consists of the novel features, details of construction, and combinations of parts, which hereinafter will be more particularly set forth, illustrated, and finally claimed.

In the accompanying drawings, forming a part of the specification, Figure 1 is a perspective view of a horseshoe embodying the invention looking at the tread side. Fig. 2 is a perspective view of a heel portion of the shoe with the calk removed. Fig. 3 is a longitudinal section of the heel portion of the shoe. Fig. 4 is a view similar to Fig. 3, showing the manner of disengaging the locking extension from the depression. Fig. 5 is a perspective view of a calk. Fig. 6 is a detail view of a modified form of calk.

Corresponding and like parts are referred to in the following description and indicated in all the views of the drawings by the same reference characters.

The horseshoe 1 may be constructed in any manner and is provided upon its tread side with calks 2, removably fitted in seats 3, the calks and seats being approximately of wedge form in cross-section, so as to interlock and prevent outward displacement of the calks when properly positioned. The seats 3 are closed at one end and open at the opposite end, the calks sliding into the seats through the open ends. The horseshoe is provided with a toe and heel calks, and the seats are formed in lugs or raised portions. A depression 4 is provided at or near the open end of each seat and is deepest at its outer end to form a shoulder, against which the outer end of the locking extension 5 abuts when the calk is forced home, so as to prevent any outward movement thereof. This depression 4 is formed in the tread side or upper wall of the seat, and a notch 6 is in communication therewith and is adapted to receive the point of an instrument 7 to admit of prying the locking extension 5 out of the depression 4 when it is required to remove the calk.

Each calk 2 has a locking extension 5 at one end for coöperation with the shouldered end of the depression 4 to secure the calk against casual displacement after being forced home in its seat. The terminal portion of the locking extension 5 is slightly bent, so as to spring into the depression 4 after it clears the shouldered end thereof, which will happen when the calk has been forced home in its seat. The locking extension 5 is an integral part of the calk, and its outer end abuts against the shouldered end of the depression 4, so as to retain the calk in position.

A horseshoe and calks embodying the invention enable the calks to be readily placed in position and removed without requiring separate fastenings—such as pins, screws, or pivoted pawls—and when a calk is slid into its seat and forced home it is automatically locked against casual displacement by the locking extension 5 springing into the depression 4 or being tapped, so as to enter said depression. When from any cause it is desired to remove a calk, an instrument, as 7, has its point entered into the notch 6 and beneath the locking extension 5 to pry the same out of the depression 4, when the calk may be removed from the seat by an outward-sliding action.

In the preferable construction the end of the calk adjacent to the locking extension 5 is recessed, as shown at $a$, thereby bringing the extremity of the extension 5 near to and in coincidence with a straight line touching the extremity of the calk having the part 5. When the recess $a$ is dispensed with, as shown in Fig. 6, the extension 5 projects wholly from the end of the calk.

Having thus described the invention, what is claimed as new is—

1. In a horseshoe provided with a seat, and a shoulder at or near the open end of the seat, a calk having an integral spring-locking extension to abut against the aforesaid shoulder and hold the calk in place when forced home into the seat, substantially as set forth.

2. A horseshoe having a seat and provided with a depression at or at near one end of the seat to form a shoulder, and a calk adapted to interlock with the said seat by a sliding movement and provided with an integral spring-locking extension to enter the aforesaid depression and abut against the shoulder thereof and hold the calk in place, substantially as set forth.

In testimony whereof I affix my signature in presence of two witnesses.

OTTO W. SIEBENHAAR. [L. S.]

Witnesses:
C. H. LITTLECHILD,
J. W. SHERN.